(12) United States Patent
Takada

(10) Patent No.: US 7,991,061 B2
(45) Date of Patent: Aug. 2, 2011

(54) TRANSMITTING DEVICE AND CONTROL METHOD THEREOF

(75) Inventor: Tomoyuki Takada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 12/040,551

(22) Filed: Feb. 29, 2008

(65) Prior Publication Data

US 2008/0219367 A1    Sep. 11, 2008

(30) Foreign Application Priority Data

Mar. 7, 2007  (JP) ................................ 2007-057243

(51) Int. Cl.
*H04K 1/10* (2006.01)

(52) U.S. Cl. ........ 375/260; 375/267; 375/299; 375/340; 375/347; 370/203; 370/204; 370/206; 370/208; 370/210; 370/480; 455/101; 455/132; 455/296; 455/500

(58) Field of Classification Search .................. 375/260, 375/299, 340, 347, 267; 370/203, 204, 206, 370/208, 210, 480; 455/101, 132, 296, 500
See application file for complete search history.

(56) References Cited

U.S. PATENT DOCUMENTS

2006/0215540 A1* 9/2006 Krishnamoorthi et al. ... 370/208
2008/0043866 A1* 2/2008 Mujtaba ........................ 375/260

FOREIGN PATENT DOCUMENTS

JP    2001-36495    2/2001
JP    2001-275194   10/2001

* cited by examiner

*Primary Examiner* — Leon Flores
(74) *Attorney, Agent, or Firm* — Fitzpatrick, Cella, Harper & Scinto

(57) ABSTRACT

A transmitting device is provided that generates OFDM symbols by identifying a sampling frequency of input data that is input from an external device, determining a number of inverse Fourier transform sample points and a number of sampling points of a redundant data portion in accordance with the identified sampling frequency, and subjecting the input data to OFDM modulation using the determined number of sampling points. The transmitting device then transmits the generated OFDM symbols.

8 Claims, 14 Drawing Sheets

FIG. 4

| SAMPLING FREQUENCY (kHz) | IFFT SAMPLING POINTS | GI SAMPLING POINTS |
|---|---|---|
| 48 | 512 | 128 |
| 96 | 256 | 64 |
| 192 | 128 | 32 |

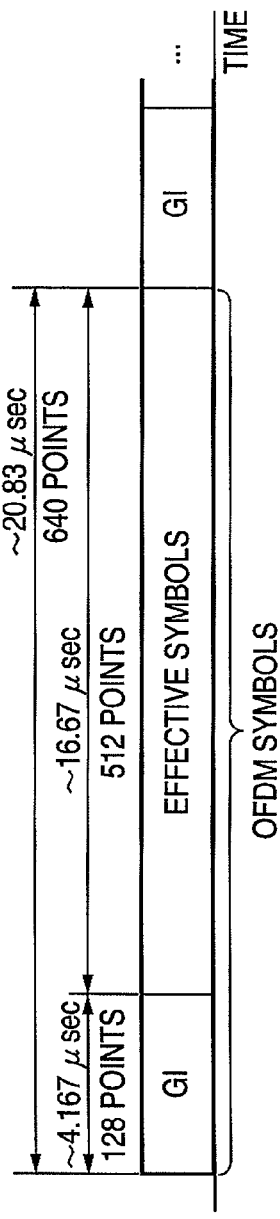
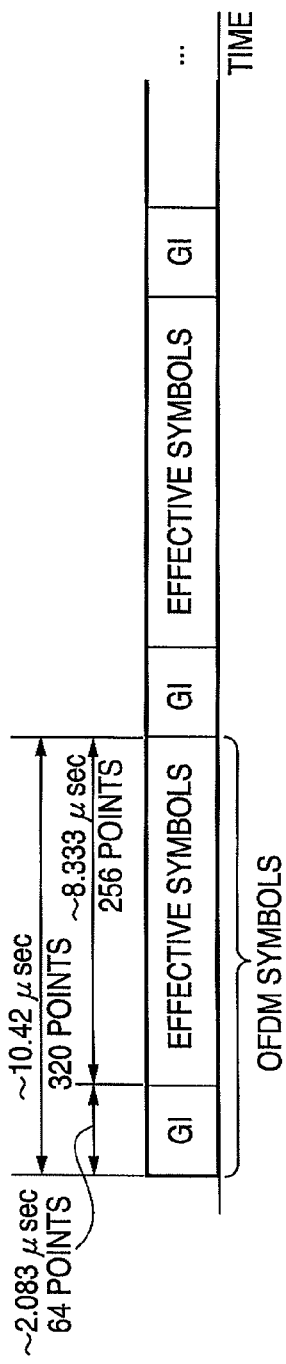
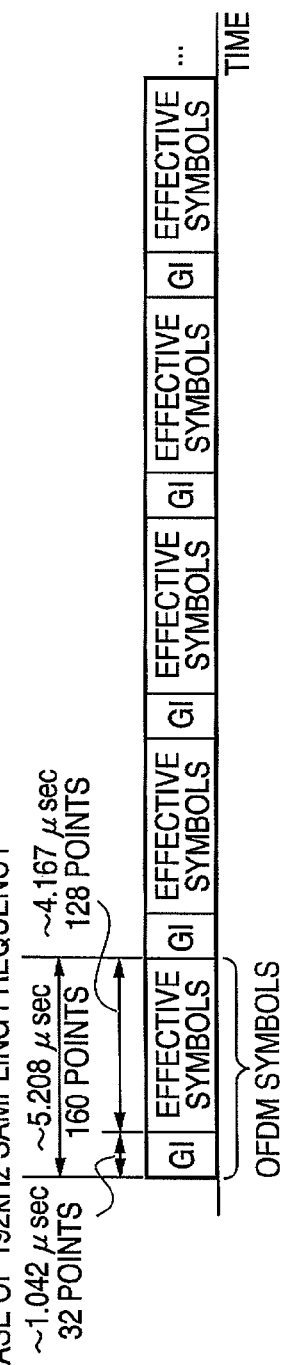
FIG. 6A CASE OF 48kHz SAMPLING FREQUENCY
FIG. 6B CASE OF 96kHz SAMPLING FREQUENCY
FIG. 6C CASE OF 192kHz SAMPLING FREQUENCY

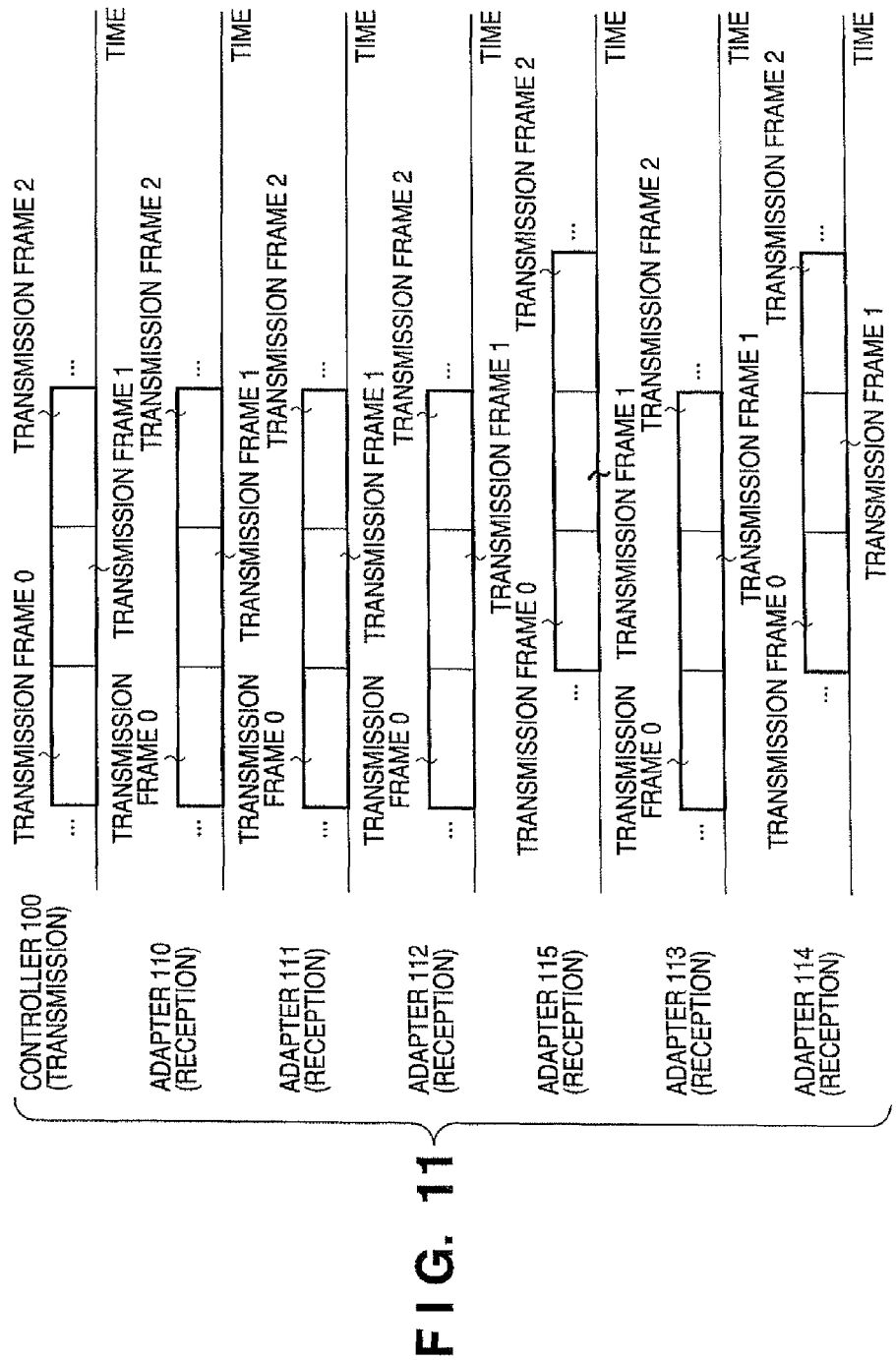
F I G. 11

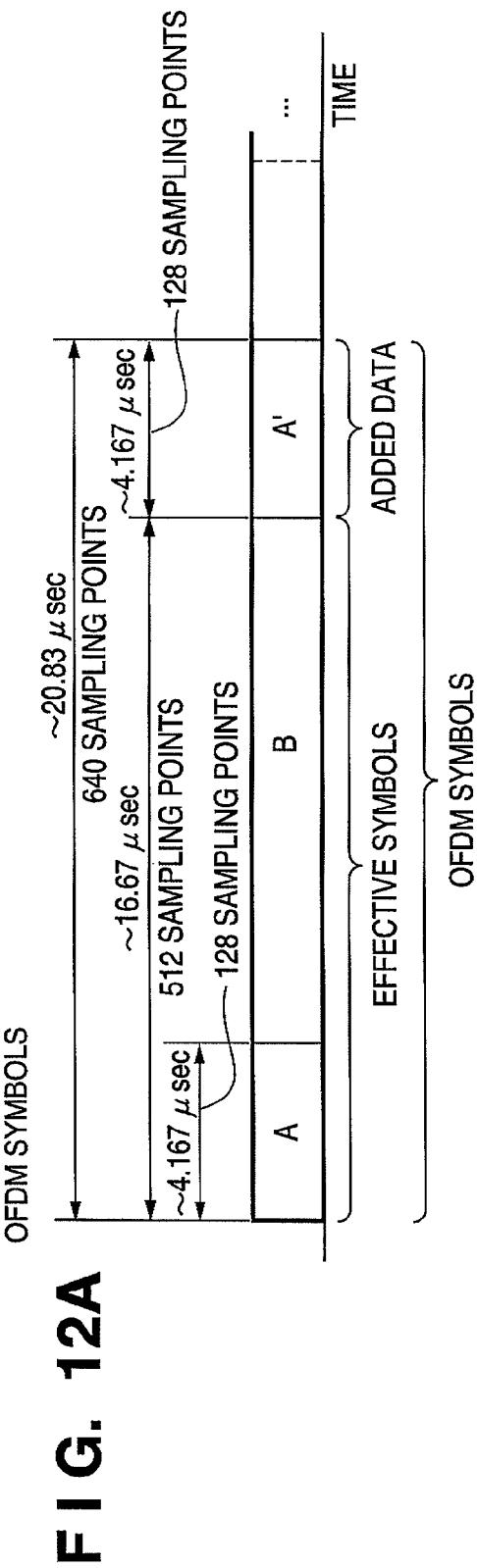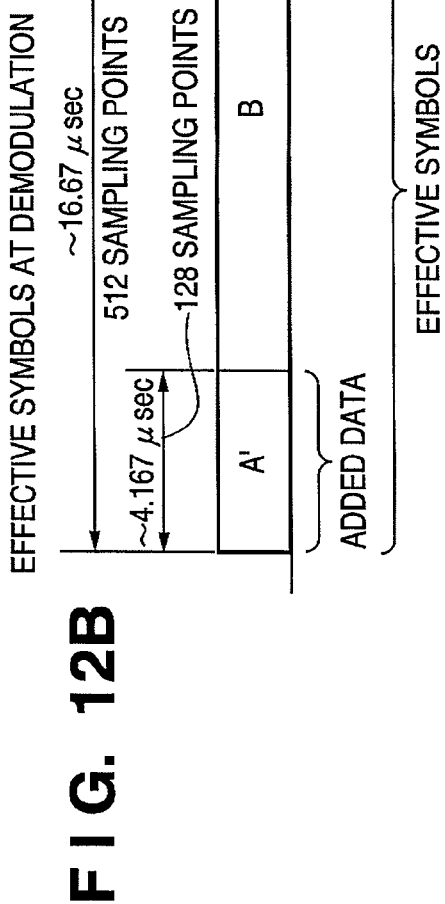
FIG. 12A
FIG. 12B

US 7,991,061 B2

TRANSMITTING DEVICE AND CONTROL METHOD THEREOF

BACKGROUND OF THE INVENTION

1. Field of the Invention

The present invention relates to a transmitting device and a control method thereof.

2. Description of the Related Art

In a conventional system that transmits and receives streaming data such as video or audio data, a transmitting device attaches a synchronization code to streaming data and transmits the data to a receiving device, and the receiving device plays back the streaming data based on the synchronization code (Japanese Patent Laid-Open No. 2001-275194).

However, according to Japanese Patent Laid-Open No. 2001-275194, hardware or software that serves as synchronization code attachment means that attaches a synchronization code to streaming data and synchronization code detection means that detects the synchronization code is required in the transmitting device and the receiving device, respectively.

SUMMARY OF THE INVENTION

An object of the present invention is to provide a transmitting device that enables playback of streaming data without comprising hardware or software that serves as synchronization code attachment means and synchronization code detection means.

According to an aspect of the present invention, a transmitting device that subjects input data that is input from an external device to OFDM modulation and transmits the resulting data, comprises:

an identification unit that identifies a sampling frequency of the input data;

a determination unit that determines a number of inverse Fourier transform sample points in accordance with a sampling frequency that is identified by the identification unit;

a generation unit that generates OFDM symbols by subjecting the input data to OFDM modulation using a number of sampling points that is determined by the determination unit; and a transmitting unit that transmits OFDM symbols that are generated by the generation unit.

According to another aspect of the present invention, a control method of a transmitting device that subjects input data that is input from an external device to OFDM modulation and transmits the resulting data, comprises:

an identification step that identifies a sampling frequency of the input data;

a determination step that determines a number of inverse Fourier transform sample points in accordance with a sampling frequency that is identified at the identification step;

a generation step that generates OFDM symbols by subjecting the input data to OFDM modulation using a number of sampling points that is determined at the determination step; and a transmitting step that transmits OFDM symbols that are generated at the generation step.

Further features of the present invention will become apparent from the following description of exemplary embodiments (with reference to the attached drawings).

BRIEF DESCRIPTION OF THE DRAWINGS

FIG. 4 is a view that illustrates the relation between OFDM parameters and the sampling frequency of audio data;

FIGS. 6A to 6C are views that illustrate the relation between OFDM symbols and the sampling frequency of audio data on a time axis;

FIG. 11 is a view that illustrates on a time axis the relation between transmission frames that are transmitted by the controller 100 and transmission frames that arrive at the respective adapters 110 to 115 according to the second embodiment; and FIGS. 12A and 12B are views that illustrate OFDM symbols generated by a different method and effective symbols at the time of demodulation thereof.

DESCRIPTION OF THE EMBODIMENTS

Hereunder, embodiments relating to the present invention are described using the attached drawings.

First Embodiment

Figure 1A:
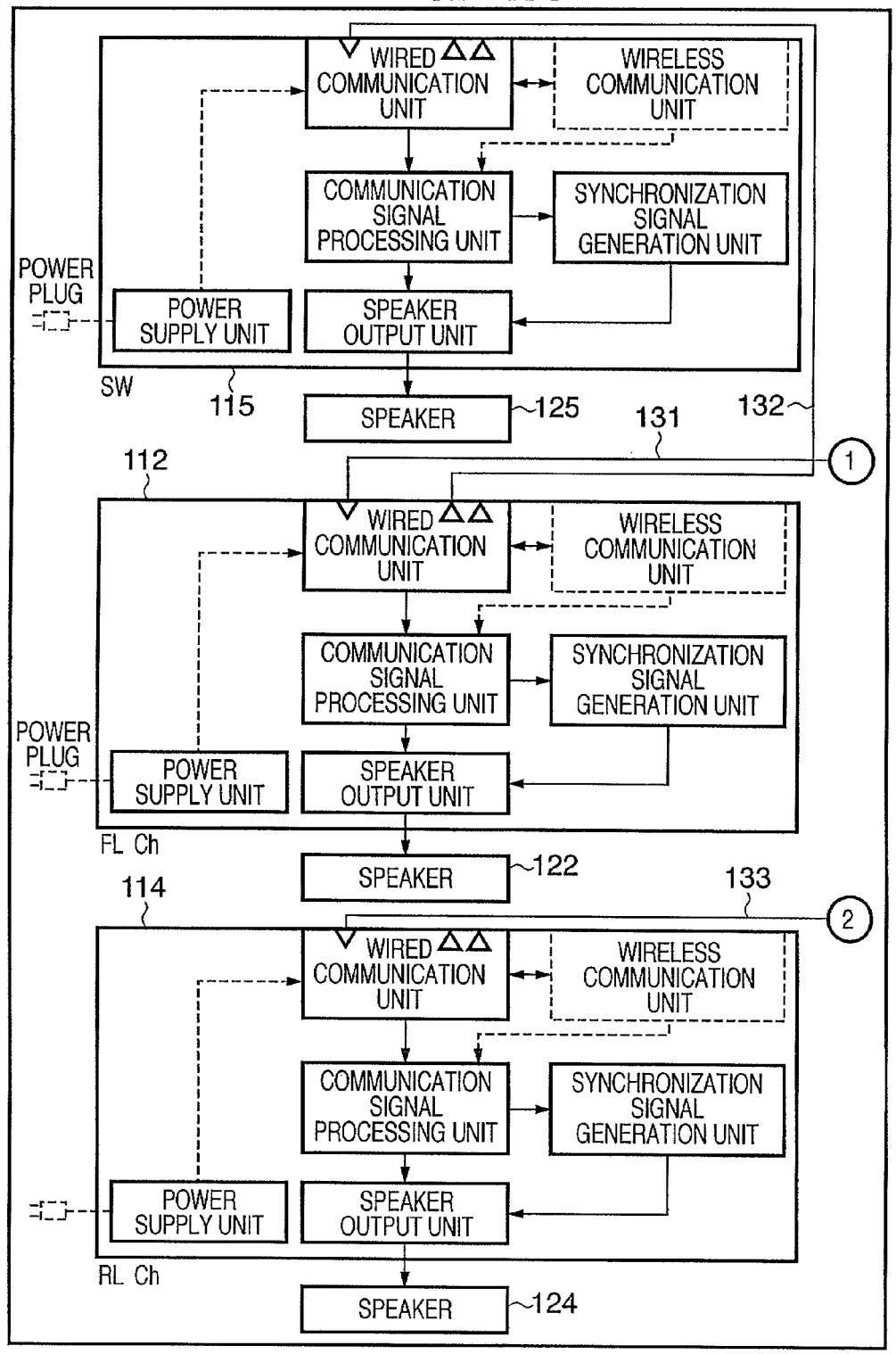
FIGS. 1A to 1C are block diagrams of a 5.1 channel surround system.
Figure 1B:
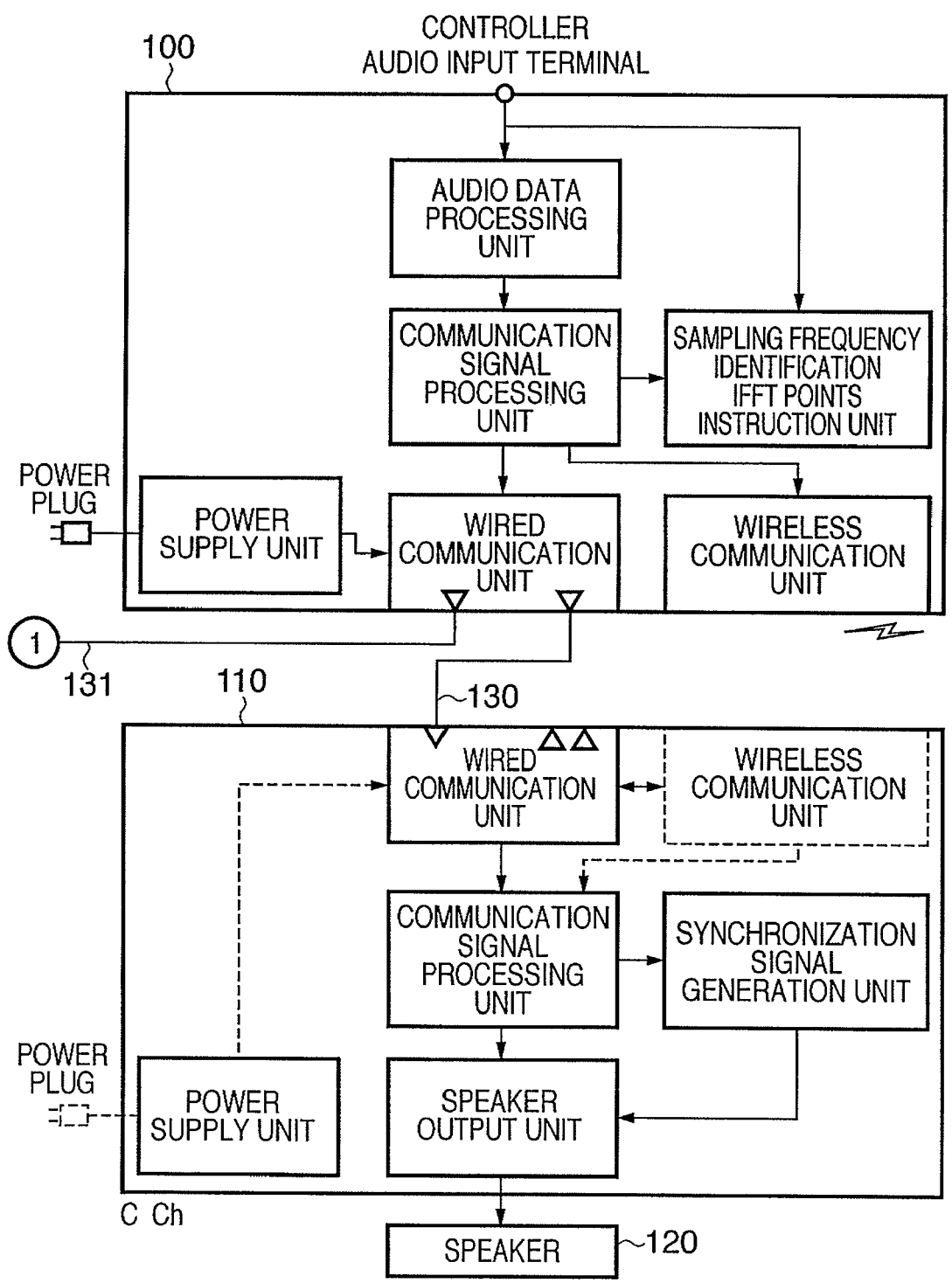
Figure 1C:
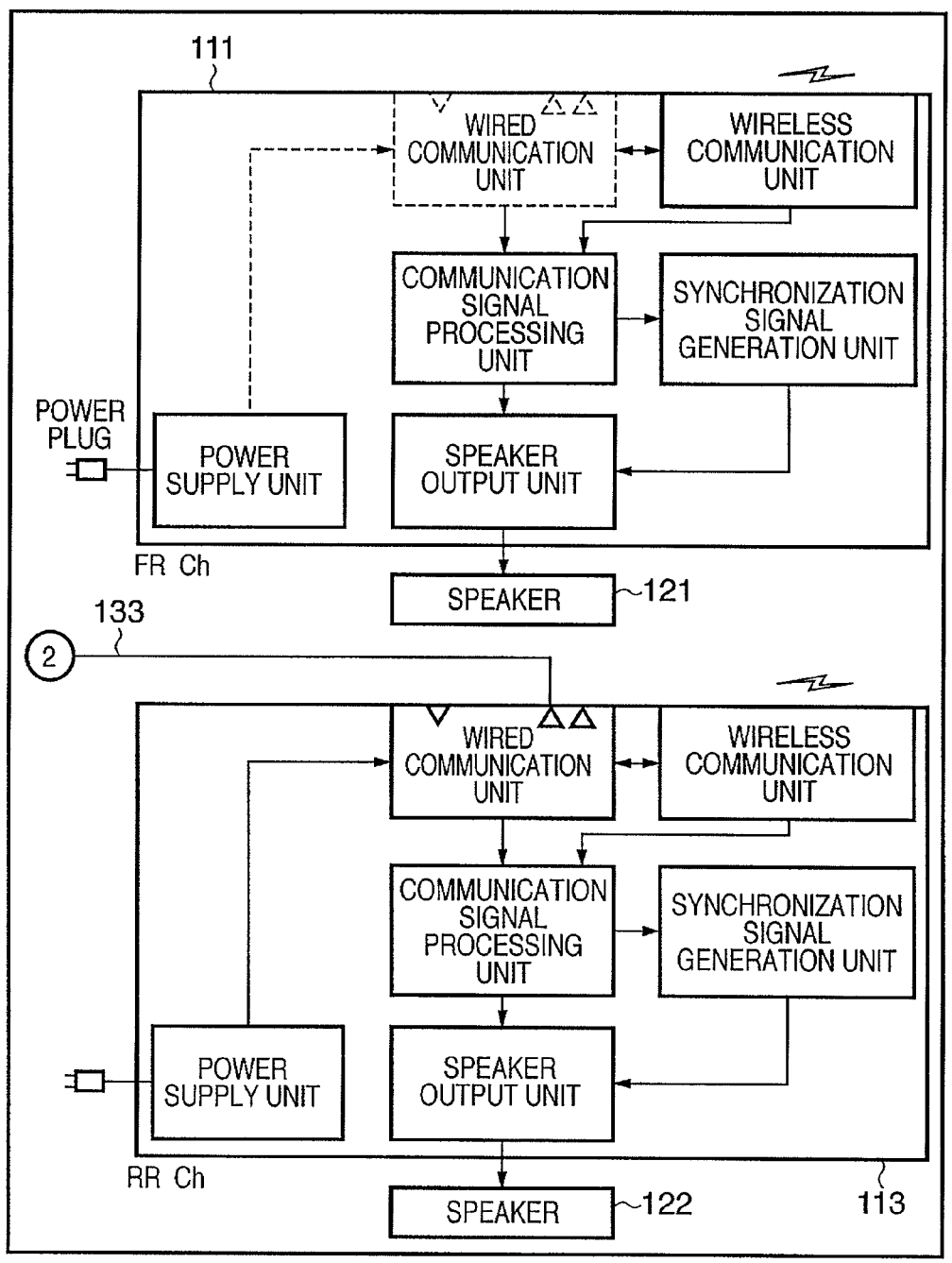

The first embodiment will now be described. FIGS. 1A to 1C are block diagrams of a 5.1 channel surround system applying the present invention.

Reference numeral 100 denotes a controller that serves as a transmitting device. The controller 100 transmits audio data as streaming data that is input from an audio input terminal to adapters 110 to 115. In this case, the controller 100 arranges the audio data in timeslots within synchronous transmission frames together with control information for the audio data in question and transmits the synchronous transmission frames (see the view illustrating the configuration of transmission frames in FIG. 3; described in detail later). The controller 100 has two outward connection terminals that connect to audio cables that connect the controller 100 to the adapters 110 to 115. The controller 100 also has a wireless communication unit for conducting wireless communication with the adapters 110 to 115 (refer to the block diagram of the controller shown in FIG. 2; described in detail later).

Reference numerals 110 to 115 denote adapters that serve as receiving devices. Surround channels that are based on the arrangement of respectively connected speakers 120 to 125 are allocated to the adapters 110 to 115.

In FIGS. 1A to 1C, a center (C), a front right (FR), a front left (FL), a rear right (RR), a rear left (RL), and a subwoofer (SW) channel are allocated to adapters 110, 111, 112, 113, 114, and 115, respectively.

The adapters 110 to 115 receive audio data and control information transmitted by the controller 100.

The adapters 110 to 115 generate audio signals for output to the respective speakers 120 to 125 based on the audio data that is transmitted from the controller, and output the audio signals to the speakers 120 to 125.

The adapters 110 to 115 have one inward connection terminal that connects an audio cable that connects the controller 100 and the adapters 110 to 115 or connects the adapters 110 to 115.

Further, the adapters 110 to 115 have two outward connection terminals that connect an audio cable that connects the adapters 110 to 115.

The adapters 110 to 115 also have a wireless communication unit for conducting wireless communication with the controller 100 (refer to the block diagram of the adapter shown in FIG. 7; described in detail later).

Reference numerals 120 to 125 denote speakers. The speakers 120 to 125 convert audio signals input from the adapters into mechanical signals, and output the mechanical signals as sound.

The adapters 110 to 115 and the speakers 120 to 125 are connected by respective cables. In this connection, the adapters 110 to 115 may be built into the respective speakers 120 to 125.

Reference numerals 130 to 133 denote audio cables. The audio cables 130 to 133 are wired transmission media. According to the present embodiment, the audio cables 130 to 133 are balanced two-core cables, and are described as cables through which data and an alternating current (AC) power signal are multiplexed and transmitted.

The connection configuration of the controller 100 and the adapters 110 to 115 in FIGS. 1A to 1C are now described.

The controller 100 and the adapters 110 and 112, the adapter 112 and the adapter 115, and the adapter 113 and the adapter 114 are connected by the audio cables 130, 131, 132, and 133, respectively.

For the connection between the controller 100 and the adapter 110, the outward connection terminal of the controller 100 and the inward connection terminal of the adapter 110 are connected.

For the connection between the controller 100 and the adapter 112, the outward connection terminal of the controller 100 and the inward connection terminal of the adapter 112 are connected.

For the connection between the adapter 112 and the adapter 115, the outward connection terminal of the adapter 112 and the inward connection terminal of the adapter 115 are connected.

For the connection between the adapter 113 and the adapter 114, the outward connection terminal of the adapter 113 and the inward connection terminal of the adapter 114 are connected.

The controller 100 and the adapters 111 and 113 are connected by wireless connection.

Audio data is transmitted from the controller 100 to the adapters 110 and 112 through the respective audio cables 130 and 131, and is transmitted from the adapter 112 to the adapter 115 through the audio cable 132. Further, audio data is transmitted from the controller 100 by wireless connection to adapters 111 and 113, and from adapter 113 to adapter 114 through the audio cable 133.

However, the present invention is not limited to the connection configuration shown in FIGS. 1A to 1C. For example, in the connection configuration shown in FIGS. 1A to 1C, the configuration for transmission of audio data by wireless connection is one in which the controller 100 is a transmitter.

However, for a case that uses a frequency band, such as a 2.4 GHz band or a 5 GHz band, with low directivity of electromagnetic waves, any single arbitrary device among the group consisting of the controller 100 and the adapters 110 to 115 can be employed as a transmitter. Further, for a case that uses a frequency band, such as a millimeter wave band, with high directivity of electromagnetic waves, a plurality of devices can be employed as transmitters within a range in which interference is not caused with respect to the electromagnetic waves.

The power receiving method of the controller 100 and the adapters 110 to 115 will now be described.

The controller 100 receives power from a power plug that is connected to a commercial power source. The controller 100 eliminates noise from the power signal that is received from the power plug, and outputs the power signal to an outward connection terminal. More specifically, data and an AC power signal are multiplexed and output to the outward connection terminal.

When an audio cable is connected to the inward connection terminal of the adapters 110 to 115, the adapters 110 to 115 receive power from the audio cable. In contrast, when an audio cable is not connected to the inward connection terminal, the adapters 110 to 115 receive power from a power plug that is connected to a commercial power source.

Further, when an audio cable is connected to the outward connection terminal, the adapters 110 to 115 eliminate noise from a power signal that is received from a power plug or an audio cable that is connected to an inward connection terminal, and output the power signal to the outward connection terminal. More specifically, data and an AC power signal are multiplexed and output to the outward connection terminal.

That is, in the connection configuration shown in FIGS. 1A to 1C, the adapters 110, 112, 114, and 115 receive power from the audio cables 130, 131, 132, and 133, respectively. The adapters 111 and 113 receive power from a power plug that is connected to a commercial power source. The adapter 113 eliminates noise from a power signal that is received from the power plug, and outputs the power signal to an outward connection terminal.

According to the present embodiment, all of the devices, irrespective of whether they are wired or wireless, are described as devices that are, in effect, connected in a bus configuration.

Figure 8:
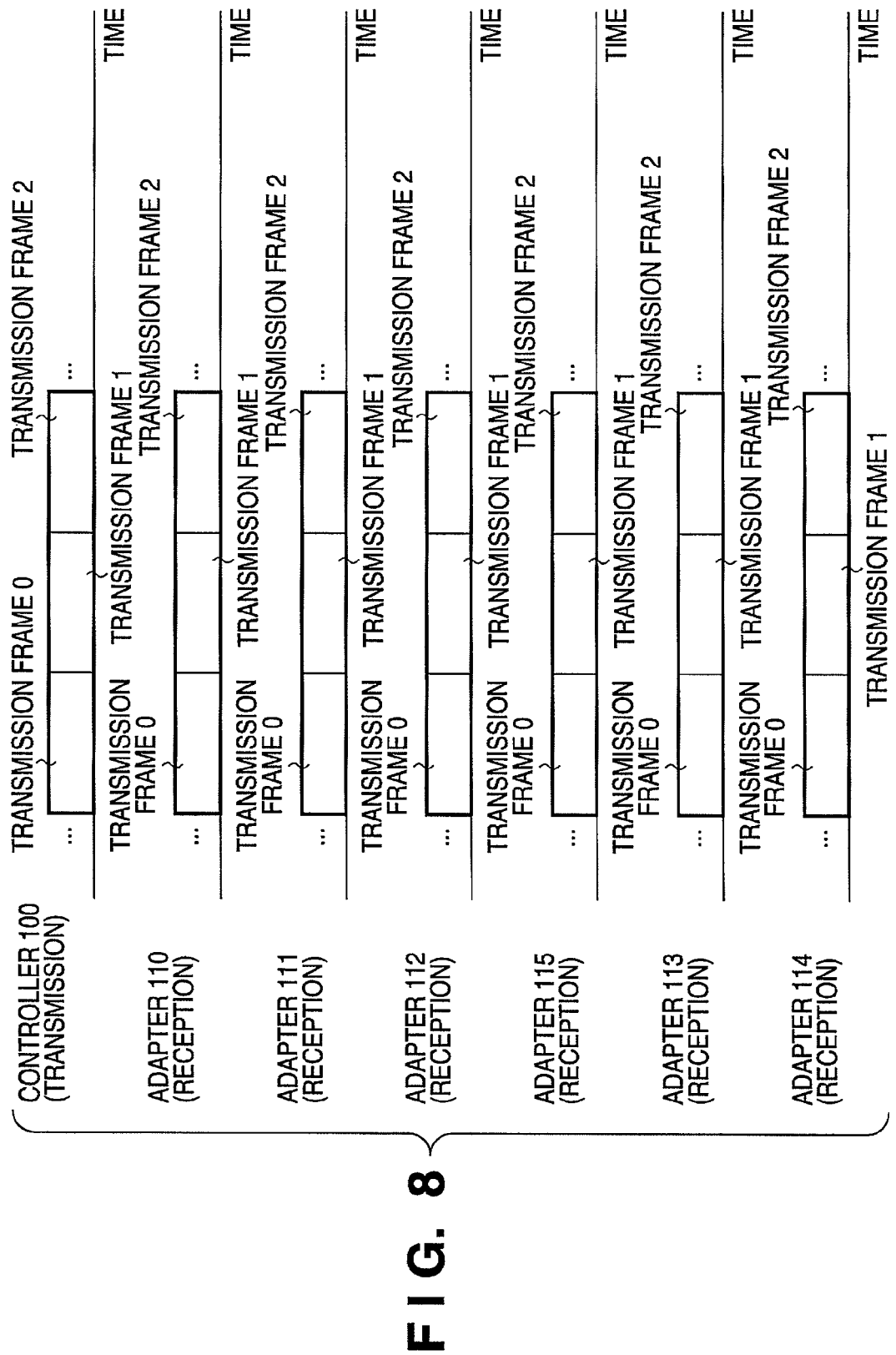
FIG. 8 is a view that illustrates on a time axis the relation between transmission frames that are transmitted by the controller 100 and transmission frames that arrive at the respective adapters 110 to 115 according to the first embodiment.

FIG. 8 is a view that illustrates on a time axis the relation between transmission frames transmitted by the controller 100 and transmission frames that arrive at the respective adapters 110 to 115 in the present embodiment.

According to the present embodiment, since all of the devices are, in effect, connected in a bus configuration, transmission frames transmitted by the controller 100 arrive at the adapters 110 to 115 at approximately the same time. Consequently, the adapters 110 to 115 can easily synchronize the audio signals of all channels and output the audio signals to the speakers 120 to 125.

Hereunder, the details of each block are described.

Figure 2:
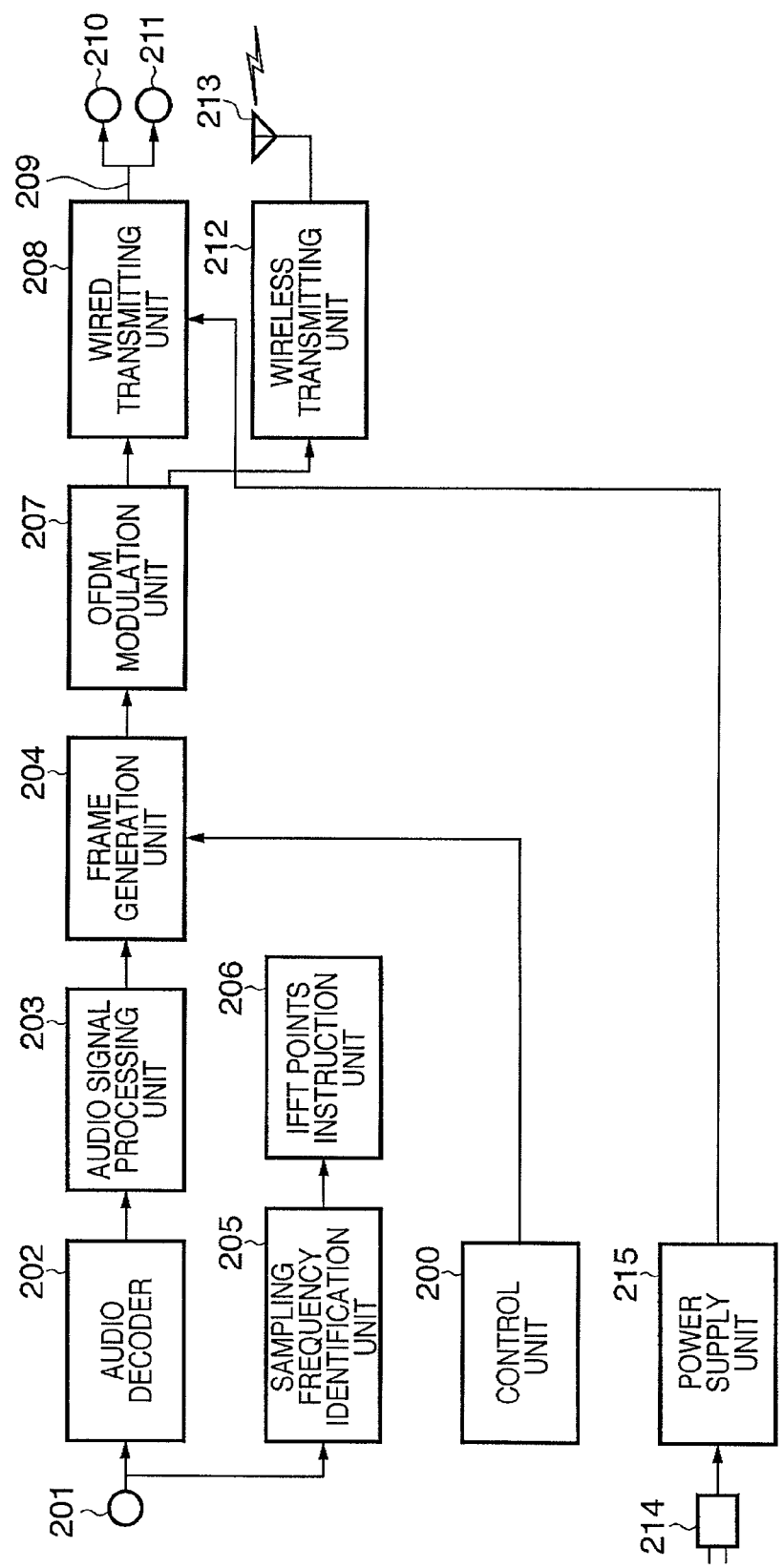
FIG. 2 is a block diagram of a controller 100 according to a first embodiment.

FIG. 2 is a block diagram of the controller 100.

Reference numeral 200 denotes a control unit. The control unit 200 executes control of each block (signal lines are not shown). For example, the control unit 200 selects a communication interface (wired transmitting unit 208, wireless transmitting unit 212) to be used based on the connection configuration of the controller 100.

For the connection configuration shown in FIGS. 1A to 1C, the control unit 200 executes control so as to use both communication interfaces. The control unit 200 also outputs control information with respect to the adapters 110 to 115 to a frame generation unit 204.

Reference numeral 201 denotes an audio input terminal. A cable that is connected to an optical disk audio player or the like is connected to the audio input terminal 201, and digitally encoded multi-channel audio data is input through the cable to the audio input terminal 201. Audio data that is input to the audio input terminal 201 is input to an audio decoder 202 and a sampling frequency identification unit 205.

The audio decoder 202 decodes digitally encoded audio data that is input to the audio input terminal 201 to generate audio data for each channel, and outputs the decoded audio data to an audio signal processing unit 203.

The audio signal processing unit 203 subjects audio data of each channel that is input from the audio decoder 202 to frequency characteristic correction, playback delay time correction, and amplitude correction or the like, and outputs the resulting data to the frame generation unit 204.

The frame generation unit 204 arranges the audio data for each channel that is input from the audio signal processing unit 203 and the control information for the adapters 110 to 115 that is input from the control unit 200 in transmission frames, and outputs the transmission frames to an OFDM modulation unit 207.

Figure 3:
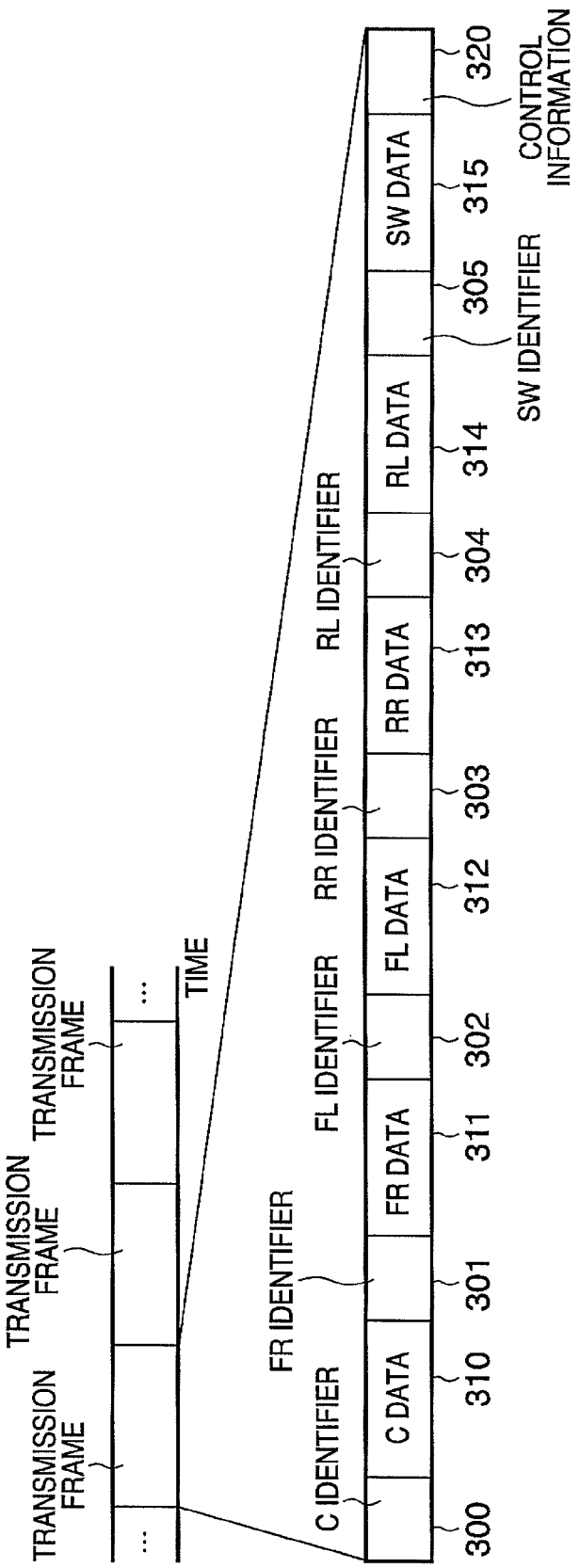
FIG. 3 is a view illustrating the configuration of transmission frames.

FIG. 3 is a view that illustrates the configuration of transmission frames. Reference numerals 310 to 315 denote audio data for each channel.

Reference numeral 320 denotes control information for the relevant audio data. The control information 320 and audio data 310 to 315 for each channel are arranged in specific timeslots that are previously determined between the controller 100 and the adapters 110 to 115. One transmission frame has audio data for exactly the amount of one sampling point of an audio signal. In FIG. 3, the audio data 310, 311, 312, 313, 314, and 315 are audio data for the C, FR, FL, RR, RL, and SW channel, respectively.

The sampling frequency identification unit 205 identifies the sampling frequency of audio data that is input to the audio input terminal 201, and outputs information showing the audio data sampling frequency to an IFFT (Inverse Fast Fourier Transform) sampling points instruction unit 206. In the present embodiment, a description is made that assumes the sampling frequency of audio data is 48 kHz, 96 kHz, or 192 kHz.

The IFFT sampling points instruction unit 206 outputs an instruction to be applied for orthogonal frequency division multiplex (OFDM) modulation to the OFDM modulation unit 207 based on information showing the sampling frequency of audio data that is input from the sampling frequency identification unit 205.

Next, an instruction which is output from the IFFT sampling points instruction unit 206 to be applied to OFDM modulation is described.

FIG. 4 is a view that illustrates the relation between OFDM parameters and sampling frequency of audio data.

The IFFT sampling points instruction unit 206 sends an instruction regarding inverse fast Fourier transform (IFFT) sampling points and guard interval (GI) sampling points to the OFDM modulation unit 207 based on the table shown in FIG. 4. In this case, the GI sampling points are a specific proportion with respect to the IFFT sampling points. For example, when the sampling frequency of an audio signal is 48 kHz, the number of IFFT sampling points is 512 and the number of GI sampling points is 128, which is 25 percent of the number of IFFT sampling points.

The OFDM modulation unit 207 subjects transmission frames input from the frame generation unit 204 to OFDM modulation to generate OFDM signals, and outputs the OFDM signals to the wired transmitting unit 208 and the wireless transmitting unit 212. The OFDM modulation unit 207 generates one OFDM symbol for one transmission frame.

At this time, the OFDM modulation unit 207 subjects the transmission frames to OFDM modulation based on an instruction to be applied to OFDM modulation that is input from the IFFT sampling points instruction unit 206 (refer to the block diagram of the OFDM modulation unit shown in FIG. 5; the details are described later).

The wired transmitting unit 208 converts an OFDM signal that is input from the OFDM modulation unit 207 to a wired carrier frequency, multiplexes the resulting signal with an AC power signal that is input from a power supply unit 215, and outputs the resulting signal to a bus signal line 209.

The bus signal line 209 is a signal line that connects the wired transmitting unit 208 and the outward connection terminals 210 and 211 in a bus format.

Reference numerals 210 and 211 denote outward connection terminals. Audio cables that connect the controller 100 and the adapters 110 to 115 are connected to the outward connection terminals 210 and 211.

The wireless transmitting unit 212 converts an OFDM signal that is input from the OFDM modulation unit 207 to a wireless carrier frequency, and outputs the resulting signal to a transmission antenna 213.

At the transmission antenna 213, the OFDM signal converted to a wireless carrier frequency that is input from the wireless transmitting unit 212 is released into the atmosphere as electromagnetic waves.

Reference numeral 214 denotes a power plug. The power plug 214 is connected to a commercial power source, and outputs a commercial power signal to the power supply unit 215.

The power supply unit 215 transforms a power signal that is received from the power plug 214 into a direct current signal, and supplies the direct current signal to each block (signal lines are not shown). The power supply unit 215 also eliminates noise from the power signal that is received from the power plug 214, and outputs the resulting signal as an AC power signal to the wired transmitting unit 208.

Figure 5:
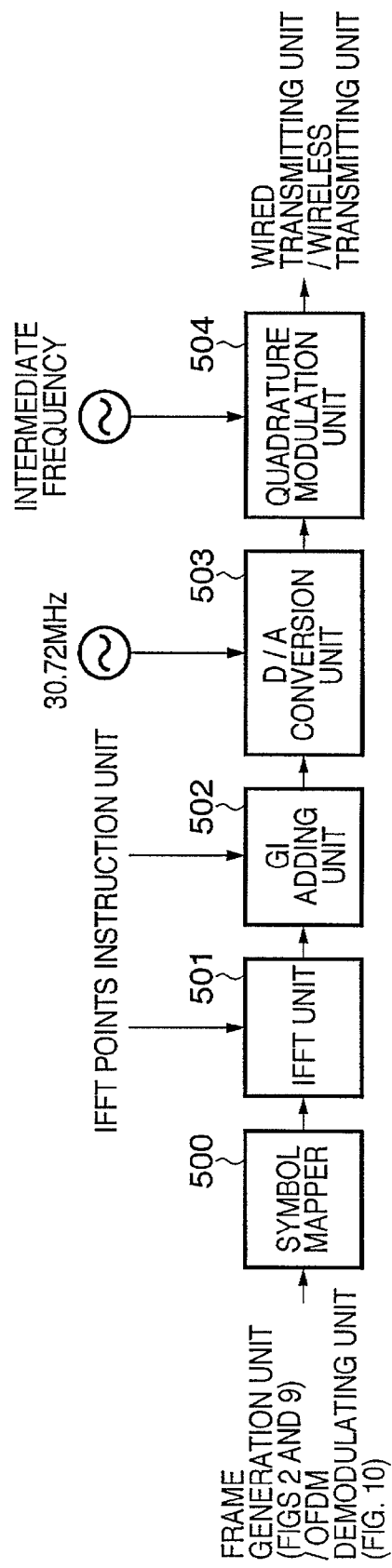
FIG. 5 is a block diagram of an OFDM modulation unit.

FIG. 5 is a block diagram of the OFDM modulation unit 207.

Reference numeral 500 denotes a symbol mapper. The symbol mapper 500 converts the data bit strings of transmission frames input from the frame generation unit 204 into complex symbol strings, and outputs the complex symbol strings to an IFFT unit 501.

The IFFT unit 501 assigns an IFFT sampling point for each symbol in a complex symbol string that is input from the symbol mapper 500 to subject the string to IFFT to generate a sample value string (time axis) of effective symbols, and outputs the sample value string of effective symbols to a GI adding unit 502.

At this time, the IFFT unit 501 assigns complex symbols to IFFT sampling points in accordance with an instruction regarding IFFT sampling points that is input from the IFFT sampling points instruction unit 206.

For example, when the IFFT sampling points instruction input from the IFFT sampling points instruction unit 206 is 512 sampling points, the IFFT unit 501 assigns complex symbols that are input from the symbol mapper to 512 sampling points.

The GI adding unit 502 generates GI data from a sample value string of effective symbols that is input from the IFFT unit 501, adds the GI data to the sample value string of effective symbols to generate a sample value string of OFDM symbols, and outputs the sample value string of OFDM symbols to a D/A (digital-analog) conversion unit 503.

At this time, the GI adding unit 502 generates GI data in accordance with an instruction regarding GI sampling points that is input from the IFFT sampling points instruction unit 206. For example, when the number of GI sampling points is 128 sampling points, the GI adding unit 502 duplicates 128 sampling points at the rear of the 512 sampling points of the sample value of effective symbols, and adds the duplicated 128 sampling points to the front of the sample value string of effective symbols. (Refer to the relation between OFDM symbols and sampling frequency of audio data shown on a time axis according to this embodiment in FIGS. 6A to 6C).

Further, the 128 sampling points at the front end of the 512 sampling points of the sample value of effective symbols may be duplicated and added to the rear of the sample value string of effective symbols. However, in this case, at the time of demodulating, equalization processing is performed to adjust the phase of received signals by using pilot symbols or pilot sub-carrier. This equalization processing is well-known as a method for demodulating OFDM signals. A sample value string that is generated by eliminating the 128 sampling points at the front end of the 640 sampling points of the sample value string of the OFDM symbols as a portion corresponding to the GI and moving the rear end 128 sampling points to that portion may be treated as the effective symbols.

FIGS. 12A and 12B are views for describing this method.

FIG. 12A is a view that illustrates OFDM symbols that are generated by this method. The GI adding unit 502 duplicates the 128 sampling points (A portion) at the front end of the 512 sampling points of the effective symbols and adds the duplicated 128 sampling points at the rear (A' portion) of the sample value string of the effective symbols (portion comprising A and B). FIG. 12B is a view that illustrates the effective symbols at demodulation. At demodulation, a sample value string (FIG. 12B) generated by eliminating the front end 128 sampling points (A portion in FIG. 12A) of the 640 sampling points of the sample value string of OFDM symbols and moving the 128 sampling points at the rear end (A' portion in FIG. 12A) to that portion is treated as the effective symbols.

The front end n sampling points (1<n<127) of the effective symbols may be duplicated and attached to the rear end thereof. Also, the rear end 128-n sampling points of the effective symbols may be duplicated and attached to the front end thereof. In this case, at the time of demodulating, equalization processing which is well-known as a method for demodulating OFDM signals is performed to adjust the phase of received signals by using pilot symbols or pilot sub-carriers.

Reference numeral 503 denotes a D/A conversion unit. The D/A conversion unit 503 subjects the sample value string of OFDM symbols input from the GI adding unit 502 to D/A conversion at a specific frequency based on the transmission bandwidth, generates a complex baseband OFDM signal, and outputs that signal to a quadrature modulation unit 504. The description of the present embodiment is made on the assumption that the D/A conversion frequency is 30.72 MHz.

The quadrature modulation unit 504 subjects the complex baseband OFDM signal that is input from the D/A conversion unit 503 to quadrature modulation at an arbitrary intermediate frequency to generate an OFDM signal, and outputs that OFDM signal to the wired transmitting unit 208 or the wireless transmitting unit 212.

Next, the relation between the sampling frequency of audio data and the D/A conversion frequency and number of IFFT sampling points is described.

FIGS. 6A to 6C are views that illustrate the relation between OFDM symbols and the sampling frequency of audio data on a time axis according to the present embodiment.

FIGS. 6A, 6B, and 6C illustrate cases in which the sampling frequency of audio data is 48 kHz, 96 kHz, and 192 kHz, respectively, i.e. cases in which the sampling period is ~20.83 μsec, ~10.42 μsec, and ~5.208 μsec, respectively.

In the present embodiment, the relation between the audio data sampling frequency fs and the D/A conversion frequency W, the number of IFFT sampling points N, and the number of GI sampling points Ng is given by the following formula:

$$1/fs = (1/W)*(N+Ng) \quad (1)$$

More specifically, the OFDM symbol length and the audio data sampling period are equal.

Further, the relation between the number of IFFT sampling points N and the number of GI sampling points Ng is given by the following formula:

$$Ng = a*N \; (a: \text{constant number}) \quad (2)$$

Accordingly, $$1/fs = (1/W)*(1+a)*N \quad (3)$$

That is, if the D/A conversion frequency W is taken as a constant, it is possible to make the OFDM symbol length match the sampling period 1/fs of the audio data by deciding the number of IFFT sampling points N.

In the present embodiment, since W=30.72 MHz (frequency of D/A conversion at the D/A conversion unit 503) and a=0.25 (ratio of number of GI sampling points to number of IFFT sampling points), then $$1/fs = 40.69 \text{ nsec}*N \quad (4)$$

Thus, as shown in FIG. 4, by making the number of IFFT sampling points N=512, 256, and 128, the respective OFDM symbol lengths can be taken as ~20.83 μsec, ~10.42 μsec, and ~5.208 μsec with respect to the audio data sampling period.

Figure 7:
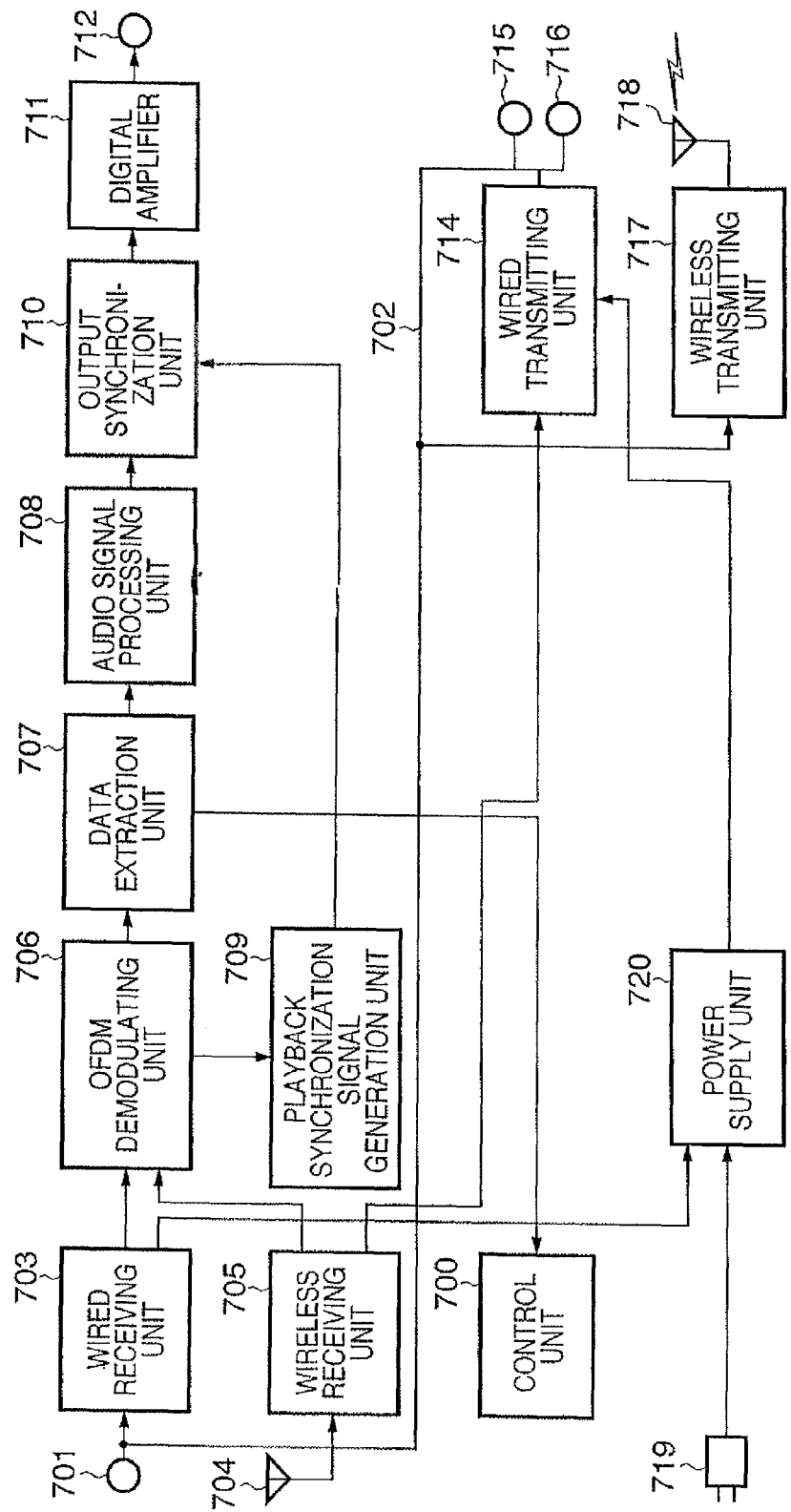
FIG. 7 is a block diagram of adapters 110 to 115 according to the first embodiment.

FIG. 7 is a block diagram of the adapters 110 to 115.

Reference numeral 700 denotes a control unit. The control unit 700 executes control of each block (signal lines are not shown). For example, the control unit 700 selects a communication interface (wired receiving unit 703, wireless receiving unit 705, wired transmitting unit 714, wireless transmitting unit 717) to be used based on the connection configuration of the relevant adapter.

For the connection configuration shown in FIGS. 1A to 1C, the control unit 700 of the adapters 110, 114, and 115 executes control so as to use the wired receiving unit 703. The control unit 700 of the adapter 111 executes control so as to use the wireless receiving unit 705 and the control unit 700 of the adapter 112 executes control so as to use the wired receiving unit 703 and the wired transmitting unit 714. The control unit 700 of the adapter 113 executes control so as to use the wireless receiving unit 705 and the wired transmitting unit 714.

Control information for the adapters 110 to 115 is input to the control unit 700 from a data extraction unit 707.

Reference numeral 701 denotes an inward connection terminal. An audio cable that connects to the controller 100 or one of adapters 110 to 115 is connected to the inward connection terminal 701.

Reference numeral 702 denotes a bus signal line. The bus signal line 702 is a signal line that connects the inward connection terminal 701, the wired receiving unit 703, the wired transmitting unit 714, the outward connection terminals 715 and 716, and the wireless transmitting unit 717 in a bus format.

The wired receiving unit 703 separates a signal on the bus signal line 702 into an OFDM signal and an AC power signal, and outputs the OFDM signal and the AC power signal to an OFDM demodulating unit 706 and a power supply unit 720.

Reference numeral 704 denotes a receiving antenna. The receiving antenna 704 receives OFDM signals that are released into the atmosphere as electromagnetic waves, and outputs the OFDM signals to the wireless receiving unit 705.

The wireless receiving unit 705 converts OFDM signals that are input from the receiving antenna 704 to an intermediate frequency, and outputs the resulting signals to the OFDM demodulating unit 706 and the wired transmitting unit 714.

The OFDM demodulating unit 706 demodulates OFDM signals that are input from the wired receiving unit 703 or the wireless receiving unit 705 to obtain transmission frames, and outputs the transmission frames to the data extraction unit 707.

The OFDM demodulating unit 706 also generates an OFDM symbol synchronization signal that is synchronized with an OFDM symbol delimiter that is detected from the OFDM signal, and outputs the OFDM symbol synchronization signal to a playback synchronization signal generation unit 709. In this case, since a method for demodulating an OFDM signal and a method for generating an OFDM symbol synchronization signal are known (for example, see Japanese Patent Laid-Open No. 2001-36495), a description is omitted here. The equalization processing which is well-known as a method for demodulating OFDM signals may be performed to adjust the phase of received signals by using pilot symbols or pilot sub-carriers.

However, in a case in which, at the GI adding unit 502, a sample value string of OFDM symbols is generated by a method that duplicates a specific number of sample points at the front end of a sample value string of effective symbols and adds the duplicated sample points at the rear of a sample value string of effective symbols, the demodulation process is as exemplified in the description of processing of the GI adding unit 502. More specifically, a sample value string that is generated by deleting the specific number of sampling points at the front end of the sample value string of OFDM symbols as a portion corresponding to GI and moving a specific number of sampling points at the rear to that portion may be handled as the effective symbols and demodulated. (Refer to views showing OFDM symbols generated by a different method and effective symbols at the time of demodulation thereof in FIGS. 12A and 12B.)

The data extraction unit 707 extracts audio data of channels assigned to the relevant adapters from transmission frames that are input from the OFDM demodulating unit 706, and outputs the audio data to an audio signal processing unit 708. The data extraction unit 707 also extracts control information from transmission frames that are input from the OFDM demodulating unit 706, and outputs the control information to the control unit 700.

Based on characteristics of speakers 120 to 125 that are connected to the relevant adapters, the audio signal processing unit 708 corrects the audio data that is input from the data extraction unit 707 and outputs the corrected data to an output synchronization unit 710.

The playback synchronization signal generation unit 709 shapes an OFDM symbol synchronization signal that is input from the OFDM demodulating unit 706 into square waves, and outputs the square waves as playback synchronization signals to the output synchronization unit 710.

The output synchronization unit 710 outputs the audio data that is input from the audio signal processing unit 708 to a digital amplifier 711 at the rise timing of a playback synchronization signal that is input from the playback synchronization signal generation unit 709.

The digital amplifier 711 amplifies audio data that is input from the output synchronization unit 710 to generate an audio signal, and outputs the signal to a speaker output terminal 712.

Cables that are connected to the speakers 120 to 125 are connected to the speaker output terminal 712.

The wired transmitting unit 714 converts an OFDM signal that is input from the wireless receiving unit 705 to a wired carrier frequency, multiplexes that signal with an AC power signal that is input from the power supply unit 720, and outputs the multiplex signal to the bus signal line 702.

Reference numerals 715 and 716 denote outward connection terminals. Audio cables that connect the adapters 110 to 115 are connected to the outward connection terminals 715 and 716.

The wireless transmitting unit 717 separates a signal on the bus signal line 702 into an OFDM signal and an AC power signal, converts the OFDM signal to a wireless carrier frequency and outputs that signal to the transmission antenna 718.

At the transmission antenna 718, the OFDM signal converted to a wireless carrier frequency that is input from the wireless transmitting unit 717 is released into the atmosphere as electromagnetic waves.

The power plug 719 is connected to a commercial power source, and outputs a commercial power signal to the power supply unit 720.

When an audio cable is connected to the inward connection terminal 701, the power supply unit 720 converts an AC power signal that is received from the audio cable into a direct current signal, and supplies the direct current signal to each block (signal lines are not shown).

In contrast, when an audio cable is not connected to the inward connection terminal 701, the power supply unit 720 converts a power signal that is received from the power plug 719 into a direct current signal, and supplies the direct current signal to each block (signal lines are not shown). The power supply unit 720 also eliminates noise from the power signal that is received from the power plug 719, and outputs the resulting signal as an AC power signal to the wired transmitting unit 714.

According to the present embodiment, it is possible to playback streaming data based on the sampling frequency of the streaming data without providing hardware or software to serve as synchronization code attachment means or synchronization code detection means.

Second Embodiment

The second embodiment will now be described. According to this embodiment a description is given in which it is assumed that all of the devices shown in FIGS. 1A to 1C are, in effect, connected in a "daisy chain format", irrespective of whether they are connected wiredly or wirelessly. Here, the term "daisy chain format" refers to a format in which each device temporarily demodulates data that is received, modulates the data again, and thereafter transmits the data to a device to which the data should be transmitted.

FIG. 11 is a view that illustrates on a time axis the relation between transmission frames that are transmitted by the controller 100 and transmission frames that arrive at the respective adapters 110 to 115 according to the present embodiment.

In the present embodiment, since the devices are connected by a daisy chain format, a delay of transmission frame units according to the number of relay steps arises in the arrival time at the respective adapters 110 to 115 of the transmission frames that are transmitted by the controller 100.

That is, in the connection configuration shown in FIGS. 1A to 1C, transmission frames that are transmitted by the controller 100 arrive at substantially the same time at the adapters 110 to 113 that are directly connected to the controller 100.

In contrast, the transmission frames arrive at a delay time of one transmission frame at the adapters 114 and 115 that are connected to the controller 100 via relay from the adapters 112 and 113, respectively.

Accordingly, in order for the adapters 110 to 115 to synchronize the audio signals of all channels for output to the speakers 120 to 125, the adapters 110 to 113 must output the audio signals in conformity with the output timing of the adapters 114 and 115.

Hereunder, the details of each block are described centering on portions that differ from the first embodiment.

Figure 9:
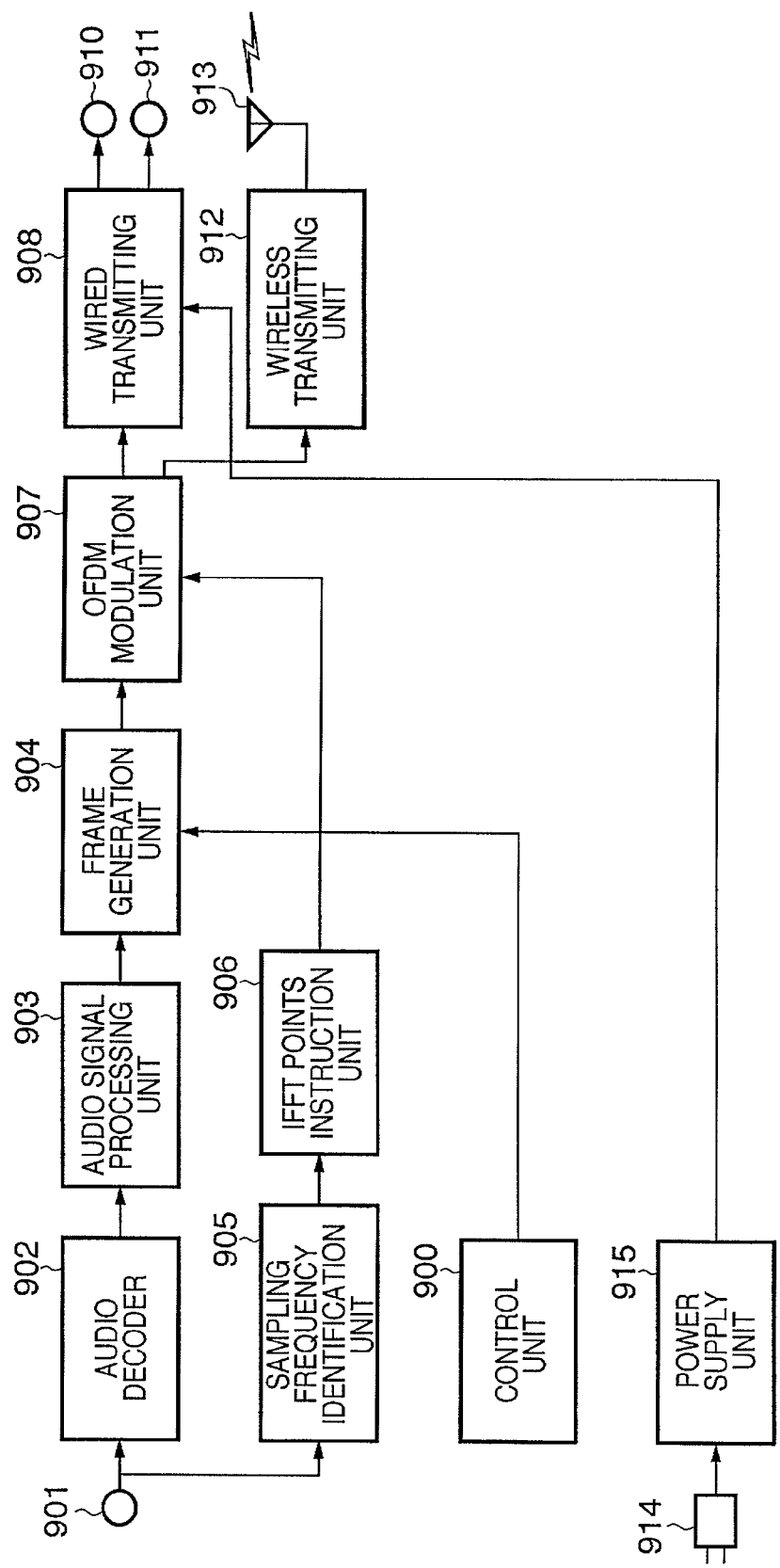
FIG. 9 is a block diagram of the controller 100 according to the second embodiment.

FIG. 9 is a block diagram of the controller 100.

Reference numeral 900 denotes a control unit. The control unit 900 executes control of each block (signal lines are not shown). For example, the control unit 900 selects a communication interface (wired transmitting unit 908, wireless transmitting unit 912) to be used based on the connection configuration of the controller 100. For the connection configuration shown in FIGS. 1A to 1C, the control unit 900 performs control so as to use both communication interfaces. Further, the control unit 900 outputs control information with respect to the adapters 110 to 115 to a frame generation unit 904.

The control information includes output delay information with respect to each of the adapters 110 to 115. The output delay information shows the time by which output to the speakers of received audio data should be delayed in transmission frame units. For the connection configuration shown in FIGS. 1A to 1C, for example, it is sufficient to set the time by which output should be delayed as one transmission frame time for adapters 110 to 113 and 0 for adapters 114 and 115.

Reference numeral 901 denotes an audio input terminal. A cable that is connected to an optical disk audio player or the like is connected to the audio input terminal 901, and digitally encoded multi-channel audio data is input through the cable to the audio input terminal 901. Audio data input to the audio input terminal 901 is input to an audio decoder 902 and a sampling frequency identification unit 906.

The audio decoder 902 decodes digitally encoded audio data that is input to the audio input terminal 901 to generate audio data for each channel, and outputs the decoded audio data to an audio signal processing unit 903.

The audio signal processing unit 903 subjects audio data of each channel that is input from the audio decoder 902 to frequency characteristic correction, playback delay time correction, and amplitude correction or the like, and outputs the resulting data to the frame generation unit 904.

The frame generation unit 904 arranges the audio data for each channel that is input from the audio signal processing unit 903 and the control information for the adapters 110 to 115 that is input from the control unit 900 in transmission frames, and outputs the transmission frames to an OFDM modulation unit 907. (Refer to view showing configuration of transmission frame in FIG. 3).

Reference numeral 905 denotes a sampling frequency identification unit. The sampling frequency identification unit 905 identifies the sampling frequency of audio data that is input to the audio input terminal, and outputs information showing the sampling frequency of the audio data to an IFFT sampling points instruction unit 906. The present embodiment is described on the assumption that the sampling frequency of audio data is 48 kHz, 96 kHz, or 192 kHz.

The IFFT sampling points instruction unit 906 outputs an instruction to be applied for orthogonal frequency division multiplex (OFDM) modulation to the OFDM modulation unit 907 based on information showing the sampling frequency of audio data that is input from the sampling frequency identification unit 905. (Refer to the view showing the relation between OFDM parameters and the sampling frequency of audio data in FIG. 4.)

The OFDM modulation unit 907 subjects transmission frames that are input from the frame generation unit 904 to OFDM modulation to generate OFDM signals, and outputs the OFDM signals to the wired transmitting unit 908 and the wireless transmitting unit 912. The OFDM modulation unit 907 generates one OFDM symbol for one transmission frame. At this time, the OFDM modulation unit 907 subjects the transmission frames to OFDM modulation based on the instruction to be applied to OFDM modulation that is input from the IFFT sampling points instruction unit 906 (see the block diagram of the OFDM modulation unit shown in FIG. 5).

The wired transmitting unit 908 converts an OFDM signal that is input from the OFDM modulation unit 907 to a wired carrier frequency, multiplexes the resulting signal with an AC power signal that is input from a power supply unit 915, and outputs the resulting signal to outward connection terminals 910 and 911. The wired transmitting unit 908 is connected to the outward connection terminals 910 and 911 by respectively independent signal lines.

Reference numerals 910 and 911 denote outward connection terminals. Audio cables that connect the controller 100 and the adapters 110 to 115 are connected to the outward connection terminals 910 and 911.

The wireless transmitting unit 912 converts an OFDM signal that is input from the OFDM modulation unit 907 to a wireless carrier frequency, and outputs the resulting signal to a transmission antenna 913.

At the transmission antenna 913, the OFDM signal converted to a wireless carrier frequency that is input from the wireless transmitting unit 912 is released into the atmosphere as electromagnetic waves.

Reference numeral 914 denotes a power plug. The power plug 914 is connected to a commercial power source, and outputs a commercial power signal to the power supply unit 915.

The power supply unit 915 converts a power signal that is received from the power plug 914 into a direct current signal, and supplies the direct current signal to each block (signal lines are not shown). The power supply unit 915 also eliminates noise from the power signal that is received from the power plug 914, and outputs the resulting signal as an AC power signal to the wired transmitting unit 908.

Figure 10:
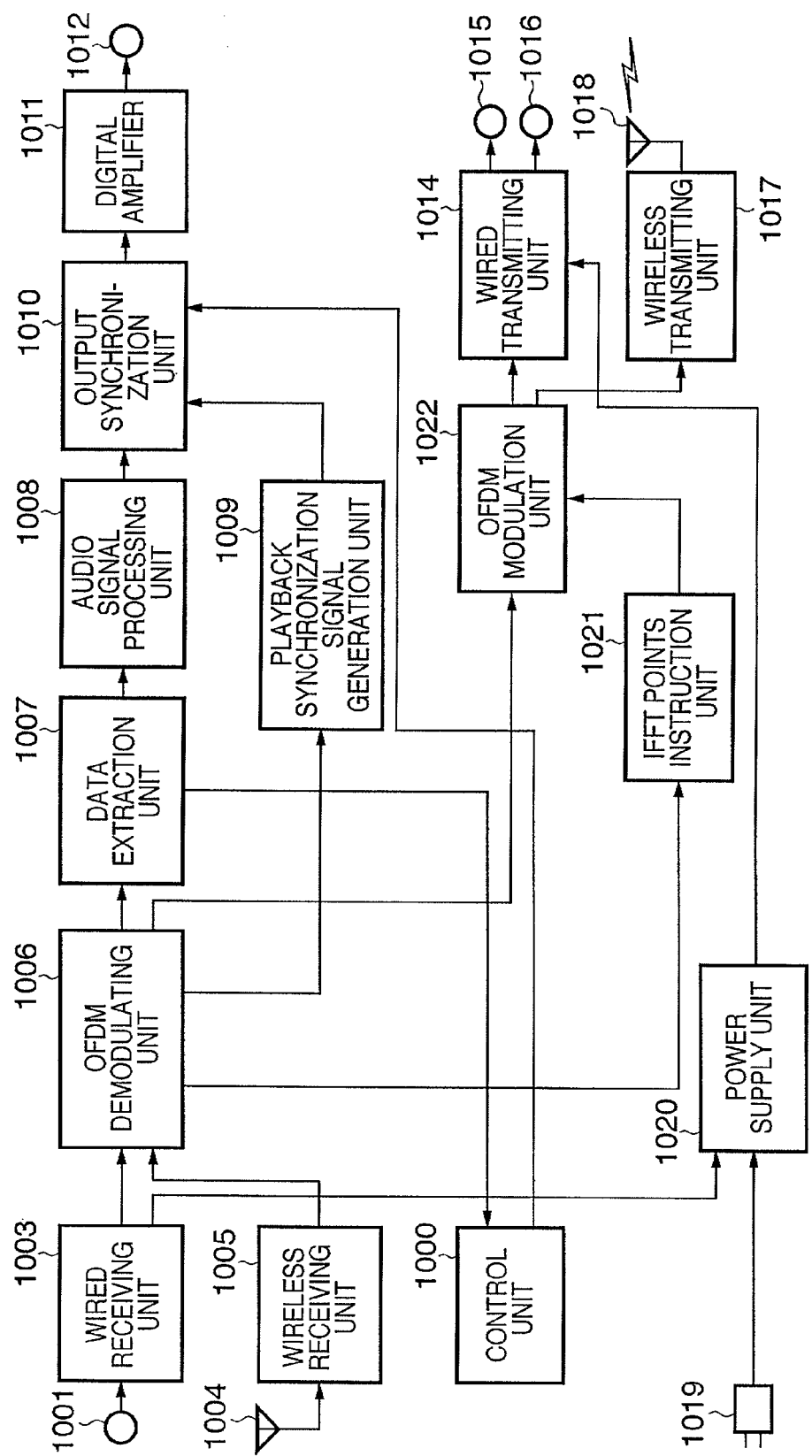
FIG. 10 is a block diagram of adapters 110 to 115 according to the second embodiment.

FIG. 10 is a block diagram of the adapters 110 to 115.

Reference numeral 1000 denotes a control unit. The control unit 1000 executes control of each block (signal lines are not shown). For example, the control unit 1000 selects a communication interface (wired receiving unit 1003, wireless receiving unit 1005, wired transmitting unit 1014, wireless transmitting unit 1017) to be used based on the connection configuration of the relevant adapter.

For the connection configuration shown in FIGS. 1A to 1C, the control unit 1000 of the adapters 110, 114, and 115 executes control so as to use the wired receiving unit 1003. The control unit 1000 of the adapter 111 executes control to use the wireless receiving unit 1005 and the control unit 1000 of the adapter 112 executes control to use the wired receiving unit 1003 and the wired transmitting unit 1014. The control unit 1000 of the adapter 113 executes control to use the wireless receiving unit 1005 and the wired transmitting unit 1014.

Control information for the adapters 110 to 115 is input to the control unit 1000 from a data extraction unit 1007. The control unit 1000 outputs the output delay information for the relevant adapter that is included in the control information to an output synchronization unit 1010.

Reference numeral 1001 denotes an inward connection terminal. An audio cable that connects to the controller 100 or one of adapters 110 to 115 is connected to the inward connection terminal 1001.

The wired receiving unit 1003 separates a signal that is input to the inward connection terminal into an OFDM signal and an AC power signal, and outputs the OFDM signal and the AC power signal to an OFDM demodulating unit 1006 and a power supply unit 1020, respectively.

Reference numeral 1004 denotes a receiving antenna. The receiving antenna 1004 receives OFDM signals that are released into the atmosphere as electromagnetic waves, and outputs the OFDM signals to the wireless receiving unit 1005.

The wireless receiving unit 1005 converts OFDM signals that are input from the receiving antenna 1004 to an intermediate frequency, and outputs the resulting signals to the OFDM demodulating unit 1006.

The OFDM demodulating unit 1006 demodulates OFDM signals that are input from the wired receiving unit 1003 or the wireless receiving unit 1005 to obtain transmission frames, and outputs the transmission frames to the data extraction unit 1007 and an OFDM modulation unit 1022.

The OFDM demodulating unit 1006 also generates an OFDM symbol synchronization signal that is synchronized with an OFDM symbol delimiter that is detected from the OFDM signal, and outputs the OFDM symbol synchronization signal to a playback synchronization signal generation unit 1009.

Further, the OFDM demodulating unit 1006 outputs an OFDM symbol frequency value (reciprocal of OFDM symbol length) that is detected from the OFDM signal to an IFFT sampling points instruction unit 1021. In this case, since a method for demodulating an OFDM signal, a method for generating an OFDM symbol synchronization signal, and a method for detecting an OFDM symbol frequency are known (for example, see Japanese Patent Laid-Open No. 2001-36495), a description is omitted here. The equalization processing which is well-known as a method for demodulating OFDM signals may be performed to adjust the phase of received signals by using pilot symbols or pilot sub-carriers.

However, in a case in which a sample value string of OFDM symbols is generated by duplicating the front end 128 sampling points of 512 sampling points of a sample value of effective symbols and adding the duplicated 128 sampling points at the rear of the sample value string of effective symbols, the process may be as exemplified in the description of processing of the GI adding unit 502. More specifically, a sample value string that is generated by deleting the front 128 sampling points of 640 sampling points of a sample value string of OFDM symbols as a portion corresponding to GI and moving the 128 sampling points at the rear to that portion may be handled as the effective symbols and demodulated.

The data extraction unit 1007 extracts audio data of channels assigned to the relevant adapters from transmission frames that are input from the OFDM demodulating unit 1006, and outputs the audio data to an audio signal processing unit 1008. The data extraction unit 1007 also extracts control information from transmission frames that are input from the OFDM demodulating unit, and outputs the control information to the control unit 1000.

Based on characteristics of speakers 120 to 125 that are connected to the relevant adapters, the audio signal processing unit 1008 corrects the audio data that is input from the data extraction unit 1007 and outputs the corrected data to an output synchronization unit 1010.

The playback synchronization signal generation unit 1009 shapes an OFDM symbol synchronization signal that is input from the OFDM demodulating unit 1006 into square waves, and outputs the square waves as playback synchronization signals to the output synchronization unit 1010.

The output synchronization unit 1010 outputs the audio data that is input from the audio signal processing unit 1008 to a digital amplifier 1011 at the rise timing of a playback synchronization signal that is input from the playback synchronization signal generation unit 1009.

However, at this time the output synchronization unit 1010 controls the output timing of the audio data based on output delay information that is input from the control unit 1000. For the connection configuration shown in FIGS. 1A to 1C, the output synchronization unit 1010 of each of the adapters 110 to 113 delay output of the audio data included in the same transmission frames (frames that arrive at the adapters 114 and 115 at a time delay of one frame relative to the adapters 110 to 113) by the time of one transmission frame, i.e. by one OFDM symbol length.

The digital amplifier 1011 amplifies audio data that is input from the output synchronization unit 1010 to generate an audio signal, and outputs the signal to a speaker output terminal 1012.

Cables that are connected to the speakers 120 to 125 are connected to the corresponding speaker output terminal 1012.

The wired transmitting unit 1014 converts an OFDM signal that is input from the OFDM modulation unit 1022 to a wired carrier frequency, multiplexes that signal with an AC power signal that is input from the power supply unit 1020, and outputs the multiplex signal to outward connection terminals 1015 and 1016. The wired transmitting unit 1014 is connected to the outward connection terminals 1015 and 1016 by respectively independent signal lines.

Audio cables that connect the adapters 110 to 115 are connected to the outward connection terminals 1015 and 1016.

The wireless transmitting unit 1017 converts an OFDM signal that is input from the OFDM modulation unit 1022 to a wireless carrier frequency, and outputs that signal to the transmission antenna 1018.

At the transmission antenna 1018, the OFDM signal converted to a wireless carrier frequency that is input from the wireless transmitting unit 1017 is released into the atmosphere as electromagnetic waves.

Reference numeral 1019 denotes a power plug. The power plug 1019 is connected to a commercial power source, and outputs a commercial power signal to the power supply unit 1020.

When an audio cable is connected to the inward connection terminal 1001, the power supply unit 1020 converts an AC power signal that is received from the audio cable into a direct current signal, and supplies the direct current signal to each block (signal lines are not shown). In contrast, when an audio cable is not connected to the inward connection terminal 1001, the power supply unit 1020 converts a power signal that is received from the power plug 1019 into a direct current signal, and supplies the direct current signal to each block (signal lines are not shown). In this case, the power supply unit 1020 also eliminates noise from the power signal that is received from the power plug 1019, and outputs the resulting signal as an AC power signal to the wired transmitting unit 1014.

The IFFT sampling points instruction unit 1021 outputs an instruction to be applied for orthogonal frequency division multiplex (OFDM) modulation to the OFDM modulation unit 1022 based on information showing the OFDM symbol frequency that is input from the OFDM demodulating unit 1006. (Refer to the view showing the relation between OFDM parameters and the sampling frequency of audio data in FIG. 4. However, instead of "sampling frequency", read OFDM symbol frequency (reciprocal of OFDM symbol length).

The OFDM modulation unit 1022 subjects transmission frames that are input from the OFDM demodulating unit 1006 to OFDM modulation to generate OFDM signals, and outputs the OFDM signals to the wired transmitting unit 1014 and the wireless transmitting unit 1017. The OFDM modulation unit 1022 generates one OFDM symbol for one transmission frame. At this time, the OFDM modulation unit 1022 subjects the transmission frames to OFDM modulation based on the instruction to be applied for OFDM modulation that is input from the IFFT sampling points instruction unit 1021 (see the block diagram of the OFDM modulation unit 207 shown in FIG. 5).

According to the present embodiment, it is possible to playback streaming data based on the sampling frequency of the streaming data without providing hardware or software to serve as synchronization code attachment means or synchronization code detection means.

Note that although in each of the above described embodiments a case using IFFT was described, naturally IDFT (Inverse Discrete Fourier Transform) can also be applied overall.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-057243, filed Mar. 7, 2007, which is hereby incorporated by reference herein in its entirety.

What is claimed is:

1. A transmitting device that subjects input data that is input from an external device to OFDM modulation and transmits the resulting data, wherein the input data have been generated by sampling a signal, said transmitting device comprising:
an identification unit that identifies a sampling frequency of the input data, which is used for generating the input data;
a determination unit that determines a number of inverse Fourier transform sample points in accordance with a sampling frequency that is identified by said identification unit;
a generation unit that generates OFDM symbols by subjecting the input data to OFDM modulation using a number of sampling points that is determined by said determination unit; and
a transmitting unit that transmits OFDM symbols that are generated by said generation unit.

2. The transmitting device according to claim 1, wherein said determination unit determines the number of inverse Fourier transform sample points so that a symbol length of the OFDM symbols is equal to a sampling period of the input data.

3. The transmitting device according to claim 1, wherein said determination unit determines the number of inverse Fourier transform sample points so that a symbol length of effective symbols to be obtained by subjecting the input data to inverse Fourier transformation is a predetermined ratio with respect to a symbol length of the OFDM symbol.

4. The transmitting device according to claim 1, wherein said determination unit further determines a number of sampling points of a redundant data portion, and the number of sampling points of the redundant data portion determined by said determination unit is determined so as to be a fixed proportion with respect to the number of inverse Fourier transform sample points.

5. The transmitting device according to claim 1, wherein said determination unit further determines a number of sampling points of a redundant data portion, and said generation unit generates OFDM symbols by duplicating a sample value string including the number of sampling points of the redundant data portion determined by said determination unit from a rear end of a sample value string of effective symbols obtained by subjecting the input data to inverse Fourier transformation, and adding the duplicated sample value string to a front end of the sample value string of effective symbols.

6. The transmitting device according to claim 1, wherein said determination unit further determines a number of sampling points of a redundant data portion, and said generation unit generates OFDM symbols by duplicating a sample value string including the number of sampling points of the redundant data portion determined by said determination unit from a front end of a sample value string of effective symbols obtained by subjecting the input data to inverse Fourier transformation, and adding the duplicated sample value string to a rear end of the sample value string of effective symbols.

7. The transmitting device according to claim 1, wherein said determination unit further determines a number of sampling points of a redundant data portion, and said generation unit generates OFDM symbols by duplicating a sample value string which includes the number of sampling points of the redundant data portion determined by said determination unit from front and rear ends of a sample value string of effective symbols obtained by subjecting the input data to inverse Fourier transformation, and adding the duplicated sample value string to the front end of the sample value string of effective symbols.

8. A control method of a transmitting device that subjects input data that is input from an external device to OFDM modulation and transmits the resulting data, wherein the input data have been generated by sampling a signal, said control method comprising:
an identification step that identifies a sampling frequency of the input data, which is used for generating the input data;
a determination step that determines a number of inverse Fourier transform sample points in accordance with a sampling frequency that is identified at said identification step;
a generation step that generates OFDM symbols by subjecting the input data to OFDM modulation using a number of sampling points that is determined at said determination step; and
a transmitting step that transmits OFDM symbols that are generated at said generation step.

* * * * *